US009973346B2

United States Patent
McLaughlin et al.

(10) Patent No.: US 9,973,346 B2
(45) Date of Patent: May 15, 2018

(54) APPARATUS AND METHOD FOR USING A DISTRIBUTED SYSTEMS ARCHITECTURE (DSA) IN AN INTERNET OF THINGS (IOT) EDGE APPLIANCE

(71) Applicant: Honeywell International Inc., Morris Plains, NJ (US)

(72) Inventors: Paul F. McLaughlin, Ambler, PA (US); David Barry Granatelli, Lilyfield (AU)

(73) Assignee: Honeywell International Inc., Morris Plains, NJ (US)

( * ) Notice: Subject to any disclaimer, the term of this patent is extended or adjusted under 35 U.S.C. 154(b) by 214 days.

(21) Appl. No.: 14/962,722

(22) Filed: Dec. 8, 2015

(65) Prior Publication Data

US 2017/0163436 A1     Jun. 8, 2017

(51) Int. Cl.
| | |
|---|---|
| G06F 15/173 | (2006.01) |
| G06F 15/16 | (2006.01) |
| H04L 12/28 | (2006.01) |
| G05B 15/02 | (2006.01) |
| H04L 12/24 | (2006.01) |
| H04L 29/08 | (2006.01) |
| H04L 29/06 | (2006.01) |

(52) U.S. Cl.
CPC .......... *H04L 12/2816* (2013.01); *G05B 15/02* (2013.01); *H04L 41/0803* (2013.01); *H04L 63/083* (2013.01); *H04L 67/10* (2013.01); *H04L 67/104* (2013.01)

(58) Field of Classification Search
CPC .................. H04L 12/2816; H04L 41/0803
USPC .................. 709/220–224, 201–203
See application file for complete search history.

(56) References Cited

U.S. PATENT DOCUMENTS

| | | | |
|---|---|---|---|
| 7,466,713 B2 | 12/2008 | Saito | |
| 7,970,830 B2 | 6/2011 | Staggs et al. | |
| 8,875,223 B1 | 10/2014 | Chen et al. | |
| 9,000,896 B1 * | 4/2015 | Kim | H04L 12/2816 340/10.3 |
| 9,054,961 B1 | 6/2015 | Kim et al. | |
| 9,246,877 B2 | 1/2016 | Dalvi et al. | |
| 9,740,951 B2 * | 8/2017 | Vrabete | G06K 9/3241 |
| 2003/0101434 A1 | 5/2003 | Szyperski | |
| 2006/0164199 A1 | 7/2006 | Glide et al. | |
| 2014/0359035 A1 | 12/2014 | Wang et al. | |

(Continued)

OTHER PUBLICATIONS

Paul F. McLaughlin, et al., "Apparatus and Method for Using a Security Appliance with IEC 61131-3", U.S. Appl. No. 14/962,904, 29 pages.

(Continued)

*Primary Examiner* — Bharat N Barot (57) ABSTRACT

An internet of things (IoT) edge appliance is configured to perform a method that includes receiving a configuration signal to configure the IoT edge appliance to communicate with at least one of a first device on the cloud network or a second device on the industrial process control and automation system network. The method also includes configuring a communication link with a cloud network and an industrial process control and automation system network. The method further includes communicating data with the at least one of the first device on the cloud network or the second device on the industrial process control and automation system network.

15 Claims, 3 Drawing Sheets

(56) References Cited

U.S. PATENT DOCUMENTS

| | | |
|---|---|---|
| 2015/0084787 A1 | 3/2015 | Jericho et al. |
| 2015/0156266 A1 | 6/2015 | Gupta |
| 2016/0164831 A1* | 6/2016 | Kim ..................... H04L 43/08 |
| | | 709/223 |
| 2016/0301695 A1* | 10/2016 | Trivelpiece ........... H04W 12/04 |
| 2017/0076168 A1* | 3/2017 | Vrabete ................ G06K 9/3241 |
| 2017/0163444 A1* | 6/2017 | McLaughlin ........... H04L 12/66 |

OTHER PUBLICATIONS

Paul F. McLaughlin, et al., "Apparatus and Method for Using an Internet of Things Edge Secure Gateway", U.S. Appl. No. 14/963,013, 28 pages.

Notification of Transmittal of the International Search Report and the Written Opinion of the International Searching Authority, or the Declaration dated Feb. 7, 2017 in connection with International Patent Application No. PCT/US2016/061810.

"Improving Manufacturing Processes, Customer Experiences, and Energy Efficiency with the Internet of Things (IOT)", Intel Corporation, Dec. 31, 2014, 7 pages.

* cited by examiner

APPARATUS AND METHOD FOR USING A DISTRIBUTED SYSTEMS ARCHITECTURE (DSA) IN AN INTERNET OF THINGS (IOT) EDGE APPLIANCE

TECHNICAL FIELD

This disclosure is generally directed to distributed systems architectures (DSAs). More specifically, this disclosure is directed to implementing a DSA with an internet of things (IoT) edge appliance in an industrial process control and automation system.

BACKGROUND

DSAs allow for supervisor control data acquisition (SCADA) systems and distributed control systems (DCSs) to be both scaled out and distributed over long distances. DSA systems can be configured to securely operate these SCADA systems and DCSs via the cloud.

SUMMARY

This disclosure relates to an apparatus and method for using an internet of things (IoT) edge appliance in an industrial process control and automation system.

In a first embodiment, a method is provided. The method includes discovering, by an internet of things (IoT) edge appliance, a communication link with a cloud network and an industrial process control and automation system network. The method includes receiving, by the IoT edge appliance, a configuration signal to configure the IoT edge appliance to communicate with at least one of a first device on the cloud network or a second device on the industrial process control and automation system network. The method includes configuring, by an internet of things (IoT) edge appliance, a communication link with a cloud network and an industrial process control and automation system network. The method further includes communicating data, by the IoT edge appliance, with the at least one of the first device on the cloud network or the second device on the industrial process control and automation system network.

In a second embodiment, an IoT edge appliance including processing circuitry is provided. The processing circuitry is configured to receive a configuration signal to configure the IoT edge appliance to communicate with at least one of a first device on the cloud network or a second device on the industrial process control and automation system network. The processing circuitry is also configured to configure a communication link with a cloud network and an industrial process control and automation system network. The processing circuitry is further configured to communicate data with the at least one of the first device on the cloud network or the second device on the industrial process control and automation system network.

In a third embodiment, a non-transitory, computer-readable medium storing one or more executable instructions is provided. The one or more executable instructions, when executed by one or more processors, cause the one or more processors to discover a communication link with a cloud network and an industrial process control and automation system network. The one or more executable instructions, when executed by the one or more processors, cause the one or more processors to receive a configuration signal to configure an IoT edge appliance to communicate with at least one of a first device on the cloud network or a second device on the industrial process control and automation system network. The one or more executable instructions, when executed by one or more processors, also cause the one or more processors to configure a communication link with a cloud network and an industrial process control and automation system network. The one or more executable instructions, when executed by the one or more processors, further cause the one or more processors to communicate data with the at least one of the first device on the cloud network or the second device on the industrial process control and automation system network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Distributed systems architectures (DSAs) allow for SCADA systems and DCSs to be both scaled out as well as distributed over long distances. Incorporating the capabilities of a DSA to an internet of things (IoT) edge appliance, the IoT edge appliance can permit communication between an IoT cloud network including, for example, applications, big data storage, and analytics with on-premise devices (such as sensors, actuators, controllers, human-machine interfaces (HMIs), and on-site applications) using the capabilities of a DSA.

Figure 1:
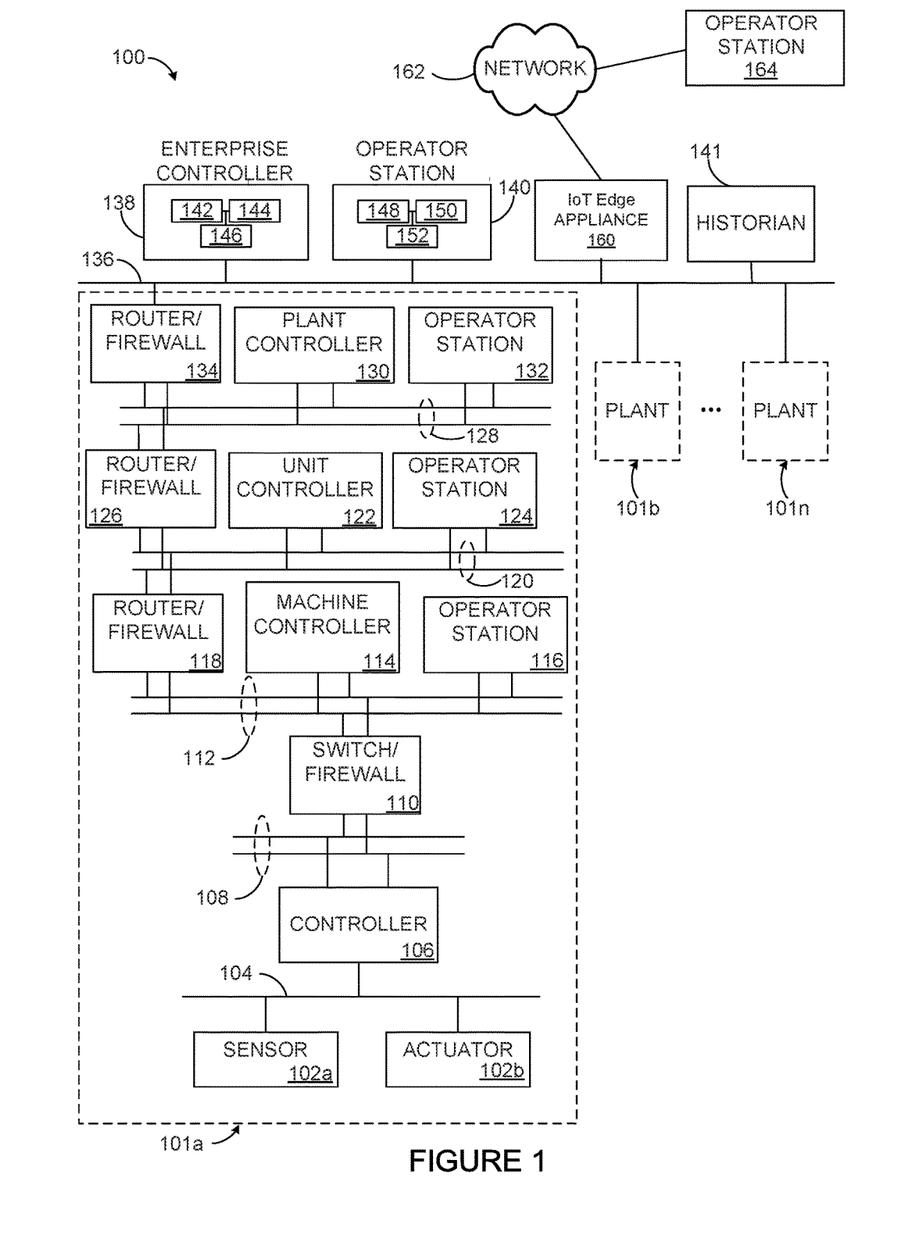
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide edge access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

In accordance with this disclosure, the system 100 also includes an IoT edge appliance 160. The IoT edge appliance 160 integrates the plants 101a through 101n and the network 136 with a cloud network 162 and one or more operator stations 164. The IoT edge appliance 160 includes a distributed systems architecture (DSA) that allows for SCADA systems and DCSs to be both scaled out as well as distributed over long distances via communication between an IoT cloud network including, for example, applications, big data storage, and analytics with on-premise devices (such as sensors, actuators, controllers, HMI, and on-site applications). The IoT edge appliance 160 is configured for both process automation and SCADA systems.

The IoT edge appliance 160 includes a DSA that is platform independent and includes a global data access (GDA) data scheme that is configured for periodic and asynchronous data access as well as alarms and events. The GDA data scheme is also configured to maintain data coherency and to access local data quickly. The IoT edge appliance 160 including the DSA, can be configured locally at an interface on the IoT edge appliance 160 or, once implemented in the system 100, can be configured via the cloud network 162 to have awareness of partner appliances and an awareness of elements (such as tag name and asset class) that are to be aggregated. In an embodiment, the IoT edge appliance 160 can have an "all" default setting to configure the IoT edge appliance 160 with partner appliances and elements to be aggregated simply when the IoT edge appliance 160 receives the partner appliance or element name. The IoT edge appliance 160 can also include security features where the IoT edge appliance 160 can only be configured by particular operators via a secured user name and password. For example, in order to activate the configuration signal to configure the IoT edge appliance 160, a user name and password is received and authenticated by the IoT edge appliance 160. In an embodiment, the secured user name and password can also provide access only to specified devices in communication with the IoT edge appliance 160.

The IoT edge appliance 160 is configured for process automation. For process automation, the IoT edge appliance 160 enables scale out of DCSs without requiring additional computers and servers, interconnectivity of wide-area plants, and a uniform presentation of data for aggregated systems to the cloud network 162 for consistent data analysis. The IoT edge appliance 160 is also configured for SCADA systems. For SCADA systems, the IoT edge appliance 160 communicatively links various distributed solutions (such as pipelines, tank farms, well heads in oil fields, and the like) for both local human-machine interfaces (HMIs) and mobility services as well as a uniform connection of the aggregation to the cloud network 162.

The IoT edge appliance 160 is a platform based on a suitable embedded real-time operating system (OS) (such as a reduced form of LINUX). On the real-time OS, a common protocol machine is layered to deliver "downstream" connectivity to on premise physical devices and systems using open protocols. These protocols can include Ethernet/IP, OPC UA, ProfiNet, IEC-61850, Modbus/TCP, HART/IP, and the like. Non-Ethernet based protocols can also be implemented using a serial communications port (such as Modbus/RTU). Data collected from these downstream protocols is mapped to a unifying abstraction layer that provides a consistent namespace and set of data services for information publication to a cloud layer.

A communication stack to the cloud network 162 includes OPC UA and its core services for synchronous and asynchronous data publication, alarms and event publication, history data transfer, blind record or "BLOB" transfer, and the like. Other cloud protocols can be supported as an alternative to or in addition to OPC UA. The other cloud protocols can have similar services including event streaming to an event hub in the cloud and data access services. The IoT edge appliance 160 can be located at various layers in a control system, and can provide security features including encryption and certificate based authentication. These services are available for both cloud based connections and on premise system and device connections. The IoT edge appliance 160 provides secure guard traffic flow bi-directionally to protect both the cloud and the on premise systems and devices (such as the devices within the plant 101a as well as the enterprise-level controller 138 and the operator station 140).

The IoT edge appliance 160 can be connected to different devices in the system 100. For example, while FIG. 1 illustrates that the IoT edge appliance 160 is positioned between the cloud network 162 and the network 136, the IoT edge appliance 160 can also be position between the network 136 and the router/firewall 134, the network 128 and the router/firewall 126, the network 120 and the router/firewall 118, the network 112 and the switch/firewall 110, the network 108 and the controller 106, the network 104 and the sensor 102a, or the network 104 and the actuator 102b. The IoT edge appliance 160 can also be positioned between the plant-level controller 130 and the network 128, the operator station 132 and the network 128, the unit controller 122 and the network 120, the operation station 124 and the network 120, the machine controller 114 and the network 112, or the operator station 116 and the network 112. The IoT edge appliance 160 can also be positioned between the network 136 and the plant 101b or the network 136 and the plant 101n. A plurality of IoT edge appliances 160 can be positioned at different locations within the system 100 as described herein.

In an embodiment, the networks 136 can represent a cloud network configured to facilitate communication between the IoT edge appliance 160 and at least one of the enterprise-level controller 138, the operator station 140, the historian 141, or one or more plants 101b-101n via wireless communication.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs.

Figure 2:
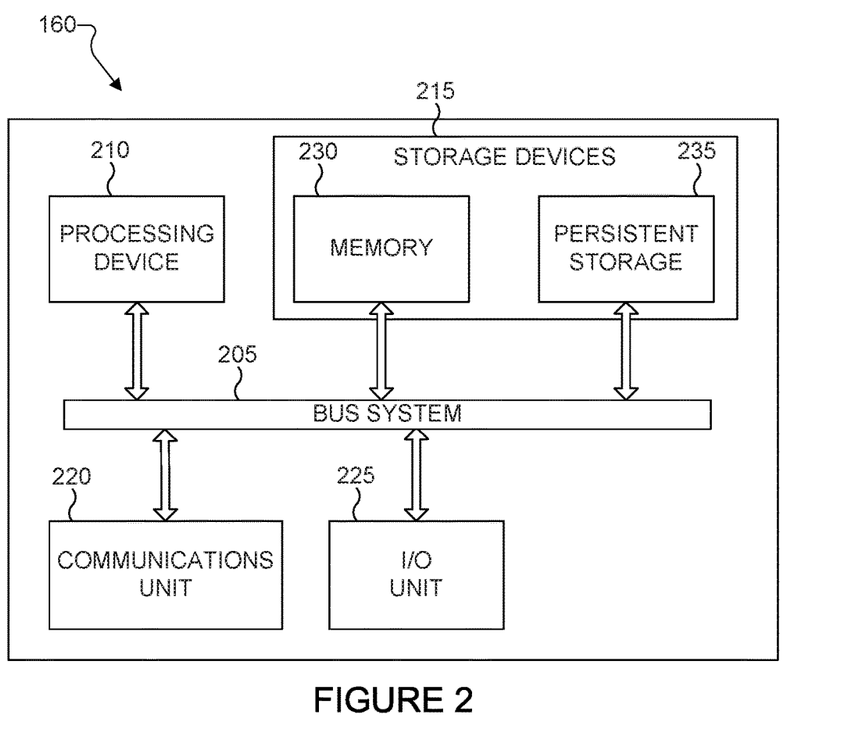
FIG. 2 illustrates an example of an IoT edge appliance according to this disclosure.

FIG. 2 illustrates an example configuration of an IoT edge appliance 160 according to this disclosure. As shown in FIG. 2, the IoT edge appliance 160 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 136. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Although FIG. 2 illustrates one example of an IoT edge appliance 160, various changes may be made to FIG. 2. For example, the IoT edge appliance 160 can come in a wide variety of configurations. The IoT edge appliance 160 shown in FIG. 2 is meant to illustrate one example type of an IoT edge appliance and does not limit this disclosure to a particular type of IoT edge appliance.

Figure 3:
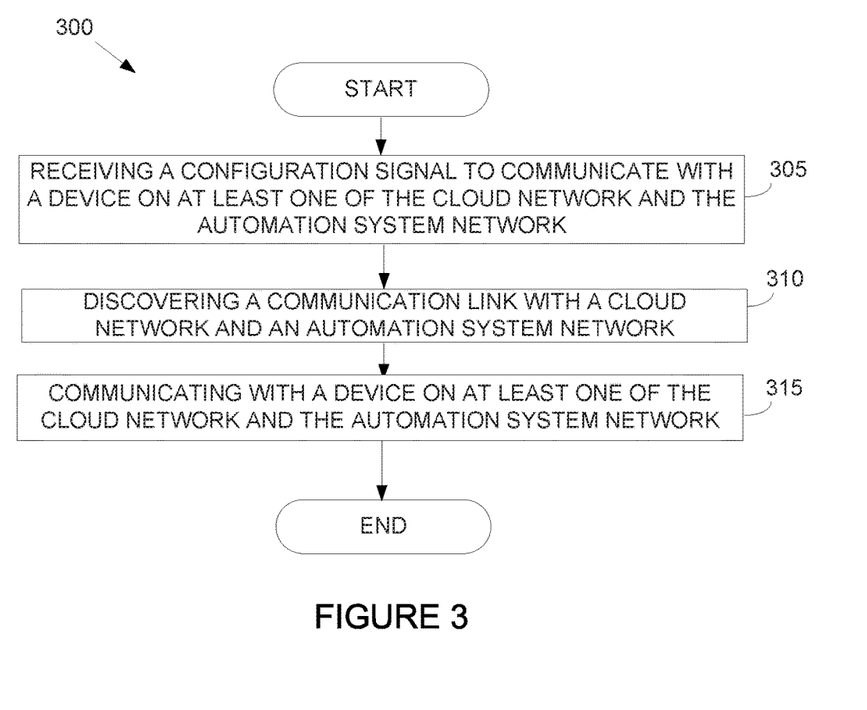
FIG. 3 illustrates an example method according to this disclosure.

FIG. 3 illustrates an example method 300 according to this disclosure. The method 300 can be implemented using any suitable devices and in any suitable systems. For example, as discussed below, the method 300 is implemented with an IoT edge appliance 160 discussed herein. For ease of explanation, the method 300 is described with respect to the system 100 of FIG. 1.

As shown in FIG. 3, at step 305, the IoT edge appliance 160 receives a configuration signal to configure the IoT edge appliance 160 for communication with at least one device of the cloud network 162 or at least one device of the industrial process control and automation system network 136. In an embodiment, the configuration signal configures that IoT edge appliance 160 to extend the industrial process control system with, for example, additional controllers or stations. Alternatively, the IoT edge appliance 160 may discover the new controllers or stations and add them to the industrial process control system. The edge appliance 160 also enables interconnectivity of wide-area plants to enable uniform view and control of any operator station.

In an embodiment, the IoT edge appliance 160 is part of a SCADA system and controls a collection of distributed solutions (such as pipelines, tank farms, well heads in oil fields, and the like). The IoT edge appliance 160 provides local HMI and mobility services as well as a consistent namespace and set of data services for information publication to a cloud layer.

At step 310, an IoT edge appliance 160 configures to communicatively link with a cloud network 162 and an industrial process control and automation system network 136. The cloud network 162 utilizes a first communication protocol and the industrial process control and automation system network 136 utilizes a second communication protocol. The IoT edge appliance 160 includes a DSA that is platform independent and includes a global data access (GDA) data scheme that is configured for periodic and asynchronous data access as well as alarms and events. The GDA data scheme is also configured to maintain data coherency and to access local data quickly.

At step 315, the IoT edge appliance 160 communicates with at least one of a device of the network 136 or the cloud network 162. For example, the IoT edge appliance 160 receives or transmits a signal to a device on the network 136 or the cloud network 162.

Although FIG. 3 illustrates one example of the method 300, various changes may be made to FIG. 3. For example, while shown as a series of steps, various steps shown in FIG. 3 could overlap, occur in parallel, occur in a different order, or occur multiple times. Moreover, some steps could be combined or removed and additional steps could be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving via a cloud network, by an internet of things (IoT) edge appliance, a configuration signal to configure the IoT edge appliance to communicate with at least one of a first device on the cloud network or a second device on an industrial process control and automation system network, wherein the IoT edge appliance includes a distributed systems architecture (DSA) and a global data access (GDA) data scheme that is configured for periodic and asynchronous data access;

configuring, by the IoT edge appliance, a communication link with the cloud network and the industrial process control and automation system network; and communicating data, by the IoT edge appliance, with the at least one of the first device on the cloud network or the second device on the industrial process control and automation system network, wherein the configuration signal configures the IoT edge appliance to enable scale out of distributed control systems (DCSs) via the cloud network without requiring additional computers or servers.

2. The method of claim 1, wherein the configuration signal configures the IoT edge appliance to facilitate interconnectivity between plants.

3. The method of claim 1, wherein a namespace and data format of the data presented to the first device on the cloud network is uniform and independent of a namespace and data format of the data presented to the second device on the industrial process control and automation system network.

4. The method of claim 3, further comprising:
when receiving the data from the first device via the cloud network, configuring the data for presentation in the namespace and data format of the second device.

5. The method of claim 1, further comprising:
receiving, by the IoT edge appliance, an input of a credential that enables the IoT edge appliance to activate the configuration signal to configure the IoT edge appliance to communicate with at least one of the first device on the cloud network or the second device on the industrial process control and automation system network.

6. The method of claim 1, wherein the configuration signal configures the IoT edge appliance to permit communication between the second device on the industrial process control and automation system network and at least a third device on the industrial process control and automation system network.

7. An internet of things (IoT) edge appliance comprising:
processing circuitry configured to:
receive via a cloud network, a configuration signal to configure the IoT edge appliance to communicate with at least one of a first device on the cloud network or a second device on an industrial process control and automation system network, wherein the IoT edge appliance includes a distributed systems architecture (DSA) and a global data access (GDA) data scheme that is configured for periodic and asynchronous data access;
configure a communication link with the cloud network and the industrial process control and automation system network; and
communicate data with the at least one of the first device on the cloud network or the second device on the industrial process control and automation system network,
wherein the configuration signal configures the IoT edge appliance to enable scale out of distributed control systems (DCSs) via the cloud network without requiring additional computers or servers.

8. The IoT edge appliance of claim 7, wherein the configuration signal configures the IoT edge appliance to facilitate interconnectivity between plants.

9. The IoT edge appliance of claim 7, wherein the configuration signal configures the IoT edge appliance to present uniform data with a namespace and data format for the first device on the cloud network, wherein the uniform data with the namespace and data format for the first device on the cloud network is independent of a namespace and data format of the data presented to the second device on the industrial process control and automation system network.

10. The IoT edge appliance of claim 9, wherein the processing circuitry is further configured to:
when receiving data from the first device via the cloud network, configure the data for presentation in the namespace and data format of the second device.

11. The IoT edge appliance of claim 7, wherein the processing circuitry is further configured to:
receive an input of a user name and password that enables the IoT edge appliance to activate the configuration signal to configure the IoT edge appliance to communicate with at least one of the first device on the cloud network or the second device on the industrial process control and automation system network.

12. The IoT edge appliance of claim 7, wherein the configuration signal configures the IoT edge appliance to permit communication between the second device on the industrial process control and automation system network and at least a third device on the industrial process control and automation system network.

13. A non-transitory, computer-readable medium storing one or more executable instructions that, when executed by one or more processors, cause the one or more processors to:
receive via a cloud signal, a configuration signal to configure an internet of things (IoT) edge appliance to communicate with at least one of a first device on the cloud network or a second device on an industrial process control and automation system network, wherein the IoT edge appliance includes a distributed systems architecture (DSA) and a global data access (GDA) data scheme that is configured for periodic and asynchronous data access;
configure a communication link with the cloud network and the industrial process control and automation system network; and
communicate data with the at least one of the first device on the cloud network or the second device on the industrial process control and automation system network,
wherein the configuration signal configures the IoT edge appliance to enable scale out of distributed control systems (DCSs) via the cloud network without requiring additional computers or servers.

14. The non-transitory, computer-readable medium of claim 13, wherein the configuration signal configures the IoT edge appliance to facilitate interconnectivity between plants.

15. The non-transitory, computer-readable medium of claim 13, wherein the configuration signal configures the IoT edge appliance to permit communication between the second device on the industrial process control and automation system network and at least a third device on the industrial process control and automation system network.

* * * * *